March 18, 1969     E. J. PARSI ET AL     3,433,726

METHOD AND APPARATUS FOR TREATING LIQUID MILK PRODUCTS

Original Filed June 8, 1962

INVENTORS:
Edgardo J. Parsi
Stuart G. M<u>c</u> Griff by: *[signature]*

ATTORNEY

INVENTORS:
Edgardo J. Parsi
Stuart G. Mc Griff by: *[signature]*

ATTORNEY

United States Patent Office 3,433,726
Patented Mar. 18, 1969

3,433,726
METHOD AND APPARATUS FOR TREATING LIQUID MILK PRODUCTS
Edgardo J. Parsi, Wellesley Hills, Mass., and Stuart G. McGriff, Washington, D.C., assignors to Ionics, Incorporated, Cambridge, Mass., a corporation of Massachusetts
Continuation of application Ser. No. 199,691, June 8, 1962. This application June 5, 1967, Ser. No. 644,453
U.S. Cl. 204—180        11 Claims
Int. Cl. B01d 13/02; B01k 5/00; A23c 9/00

ABSTRACT OF THE DISCLOSURE

This invention is directed to the treatment of liquid milk products by electrodialysis for the purpose of removing undesirable ionic constituents in the liquid milk product while simultaneously replacing said constituents, in situ, with corresponding desirable ionic constituents. The invention may be employed to reduce simultaneously any undesirable radioactive or non-radioactive ionic constituent of milk while making up a corresponding increase or replacement in another desired ion.

This case is a continuation of applicants' prior filed application, Ser No. 199,691, filed on June 8, 1962, entitled, Process and Apparatus for Decontamination of Milk Products, now abandoned.

The present invention relates in general to processes and apparatus employing electrical energy to effect a continuous migration of ions from one solution to another, across ion-permeable barriers separating the same. Particularly, it is directed to the partial or substantially complete decontamination of liquid milk products which have been polluted with radioactive fallout material. More specifically, it relates to the removal of radioactive isotopes of strontium 89 and 90, cesium 137, iodine 131, and the rare earths, such a cerium 144, from liquid milk products while maintaining other beneficial ions in said product.

As a result of fallout from nuclear explosions, milk and milk products thereof can become contaminated with various radioactive iostopes. The worst offender appears to be strontium 90 because of its 28-year half life and its tendency to deposit and accumulate in the bone structure in a manner similar to calcium. Strontium 89 and iodine 131 are not as serious a hazard because of the short half life. Although cesium 137 has a long half life, it does not present too serious a hazard since it distributes itself throughout the body and does not appear to be cumulative. Nevertheless, it is desirable that these elements be removed from liquid milk products when found to be present.

The Department of Agriculture and the U.S. Public Health Service have been actively engaged in the study of milk decontamination by the use of beds of ion-exchange material. The principles of deionizing a solution by passage through a bed of ion-exchange resin is well known. The reaction in the resin bed removes certain ions from solution—for example in the use of a cation-exchange resin, cations of strontium or the like would be removed. There are, however, certain inherent disadvantages in the decontamination of milk where resin beds are employed. The decontamination is a discontinuous process since the resin quickly exhausts itself; that is, it loses its exchange or sorption capacity and to be reused must be regenerated back to its appropriate form by treatment with chemicals. This regeneration process is time consuming, costly, and laborious. Additionally, in the decontamination of milk, it is nevertheless necessary to maintain the proper mineral equilibrium. Since the removal of the offending radioactive ions, such as strontium 90, cannot be effected without the simultaneous removal of the non-offending ions, as for example calcium, it is necessary that such elements be added to the demineralized milk, thereby reconstituting the beneficial minerals lost during the decontamination process. Thus, where ion-exchange beds are employed, the additional and separate step of adding minerals directly to the processed milk is required.

It is therefore the primary object of this invention to provide an improved electrolytic apparatus and process for the continuous removal of radioactive ions from milk and milk products.

Another object is to reconstitute the mineral content of the milk, in situ, by introducing the required minerals, simultaneously with the decontamination process, electrically through ion-exchange membranes.

A further object is to effect sufficient removal of contaminating ions without permanently altering the normal constituents present in milk.

A further object is to provide such a method and apparatus wherein the resulting milk product is safe for human consumption.

The invention, as will hereinafter be described, provides an electrodialysis apparatus of the multi-membrane type similar to those commercially available for demineralization of water. The liquid milk products to be treated in accordance with the present invention may be suitably whole milk (raw or pasteurized, and preferably homogenized), skim milk, or other liquid milk products such as buttermilk, whey and the like. Since most of the mineral contents of the aforesaid liquids are present in an ionized form, and thus capable of conducting an electric current, their treatment by electrodialysis is commercially feasible.

The use of electrodialysis cells for the removal of salts from solutions is well known, especially in the desalination of brackish water. These cells consist of an apparatus employing ion-exchange membranes having a set of diluting compartments alternately disposed between a set of concentrating compartments, and in addition, at least two terminal electrode compartments. The compartments are separated by alternating cation- and anion-exchange membranes. The solution to be desalted is passed into alternate diluting compartments while a potential is applied simultaneously across the electrodes. Under the influence of the resulting direct current, the anions of the solution are transferred across the anion-exchange membrane and the cations, across the cation membranes. Thus a decrease of electrolyte is obtained in the diluting compartments while an accumulation occurs in the adjacent concentrating compartments. Such systems are more fully described in U.S. Patents No. 2,694,680 and No. 2,848,-403.

It is, therefore, a general embodiment of the present invention to decontaminate solutions—in particular whole milk containing radioactive contaminating ions—using a novel electrodialysis cell in a novel manner. It comprises: (1) subjecting the milk by application of a direct current to electrodialysis; (2) preferably, but not necessarily, maintaining the milk at an acid pH; (3) simultaneously reconstituting the milk, in situ, with non-radioactive ions; (4) continuing the electrodialysis until the concentration of contaminating ions has been removed in an amount sufficiently safe for human consumption; and (5) adding a pH adjusting agent when necessary to approximate the pH of normal milk. The apparatus employed comprises various novel combinations of ion-permselective membranes and nonpermselective diaphragms which define repeating electrodialysis units, consisting of at least two compartments (or a multi-unit electrodialysis cell of repeating units). By passing the contaminated milk product through one compartment and an aqueous electrolytic solution of a predetermined composition through contiguous compartments, a milk product, containing less contaminating ions, will continually be obtained without substantial loss of the necessary beneficial mineral content.

The following description and appended claims contain various details identified by specific names; however, the names are intended to be as general in their application as the art will permit. Like numerals refer to like parts in the several figures of the drawings. It is to be understood that the details may be modified without departure from the principles of the invention, and that the invention may be applied to and practiced by other structures than the ones shown. The invention itself, its objects and advantages, and the manner in which it may be carried out, will all be better understood by referring to the following description taken in connection with the accompanying drawings—with particular reference to the removal of radioactive ions from whole milk.

The principles and features of the invention are readily understood by first considering the basic structure of an apparatus for practicing the same.

Figure 1:
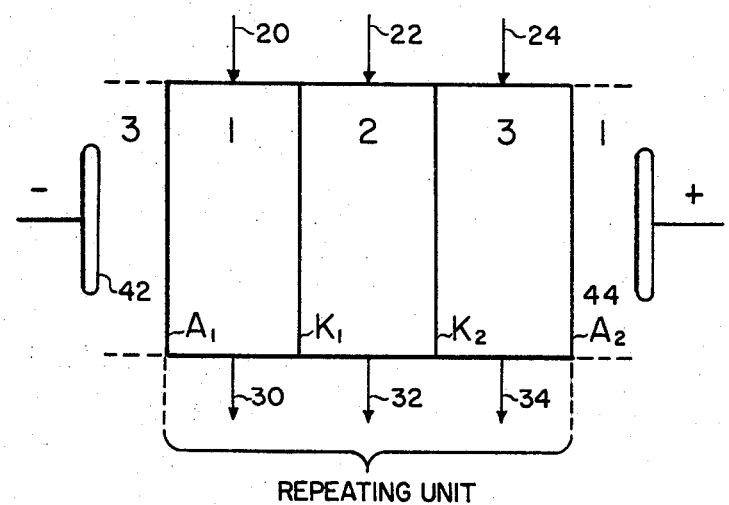
FIGURE 1 is a diagrammatic representation, in vertical cross section of one embodiment of the invention which employs ion-selective membranes for the removal of cation contaminants with simultaneous addition of non-contaminating cations.

FIGURE 1 illustrates a three-compartment repeating unit for the removal of radioactive cations from a liquid solution, for example whole milk contaminated with strontium 90. As many repeating units as desired may be employed between the end electrodes; depending only upon the particular application or required production rate. Thus, a multi-unit cell can comprise 100 or more repeating units arranged between two terminal electrode compartments, which contain respectively a cathode 42 and an anode 44. The electrode chambers (not shown) are preferably fed with a separate electrolyte stream from that of the main body of the cell. The milk decontamination compartment 2 is bounded on each side by cation permeable membranes $K_1$ and $K_2$. Waste compartment 1 is located at the cathode side of compartment 2 and is separated therefrom by cation membrane $K_1$. Reconstituting compartment 3 lies adjacent to the anode side of the decontaminating compartment 2 and is separated therefrom by cation membrane $K_2$. Compartment 1 is defined on its cathode side by anion permeable membrane $A_1$; compartment 3 is similarly defined on its anode side by anion membrane $A_2$.

In operation the milk contaminated with strontium 90 is fed into decontamination chamber 2 by means of inlet 22. Milk, containing other contaminating cations, can of course be processed by the method of this invention. The milk is made acidic to a pH preferably in the range of about 4.8 to 6, prior to entering chamber 2, for the purpose of increasing the mobility and ionization of the strontium cations resulting in the more complete removal thereof. A hydroxylated food acid, preferably citric acid, is added as the acidifying agent. Care should be exercised when introducing the acid to prevent local curdling of the milk. When the strontium 90 contaminant has been removed, the processed milk can then be readjusted to its original pH by the addition of a base, such as sodium hydroxide. Simultaneously with the passage of milk into the decontaminating compartment, an aqueous synthetic salt solution, containing the same ionic ratio of cation fractions as is normally present in whole milk, is directed into the reconstituting compartment 3 by means of inlet 24. Where it is desired that the final milk product be sodium free, the reconstituting salt solution obviously is made void of such ions. It is apparent therefore that the present invention may be employed to reduce simultaneously any undesired non-radioactive ionic constituent of milk while making up a corresponding increase or replacement in another desired ion. A weak salt solution is also passed into the waste compartment at inlet 20. It should be understood that the feed solution to the waste compartment may be water alone, although it is desirable to begin operation with an electrolyte solution in compartment 1— thereby increasing the conductivity therein. After operation of the cell has commenced, both contaminated and non-contaminated cations from compartment 2, as well as anions from compartment 3, will be continuously transferred electrically into waste compartment 1. Thereafter, water alone may be employed as the feed stream to said waste compartment. The reformed salts of the waste compartment are removed at outlet 30 at any desired concentration level by controlling the volume of water fed to said compartment. This waste stream can be disposed of, or, if desired, reprocessed to remove the strontium 90 ions. The strontium can be precipitated as a sulfate by the addition of sodium sulfate, then filtered to obtain a salt solution free of the contaminating ions, and finally reused as the synthetic salt feed to the reconstituting compartment. The effluent stream from said reconstituting compartment could then be employed in place of water as the feed stream to the waste compartment. When a direct current is applied (from an outside source not shown) transversely through the cell via cathode 42 and anode 44, the ions, contained in the solutions employed, will migrate toward the electrode having an electrical charge opposite to their own. Thus, the positively charged cations will migrate in the direction of the cathode and the negatively charged anions, toward the anode. It will be apparent from the migration of ions that cations in the milk—particularly strontium 90—will pass through cation membrane $K_1$ into waste compartment 1. Since further migration of these ions is prevented by anion membrane $A_1$ which is only selective to anions, the cations become trapped in waste compartment 1. Similarly, anion membrane $A_1$ allows anions from compartment 3 to pass into waste compartment 1, and the reformed salt solution is removed at outlet 30. Simultaneously, the non-contaminated cations of the reconstituting compartment 3 migrate into compartment 2 via cation permeable membrane $K_2$, thereby replacing the cations previously removed from the milk stream. The resulting low radioactive milk product which has a mineral content identical with, or closely approximating, normal milk is removed at outlet 32. The total ionic content of the milk will be only slighlty increased by an amount equal to the replaced radioactive ions.

An alternate method to acidify the milk located in the decontaminating compartment is to lower the pH of the make-up salt stream with an acid, for example HCl. This would allow the hydrogen ions to migrate into the milk compartment with the other noncontaminating cations to lower the pH therein.

Common influent and effluent manifolds for the fluids which pass through the respective chambers of a plurality of repeating units, are contemplated but not shown in any of the drawings. It is also to be understood that the flow of liquids through the compartments of the cell may be in series, parallel, countercurrent, or concurrent flow; with or without recirculation; or with a feed and bleed arrangement. For many purposes it may be preferred to employ batch concurrent flow operation. Various forms and thicknesses of spacers for constituting the flow chambers may also be employed. U.S. Patents No. 2,694,680 and No. 2,848,403 disclose a suitable combination of operations which may be employed in this invention.

The membranes used for purposes of this invention are electrically conductive, selectively permeable to the passage of cations or anions, and substantially impermeable to the passage of bulk liquid. Suitable membranes and the method of making the same are disclosed in U.S. Patents No. Re. 24,865, No. 2,730,768, No. 2,731,408, No. 2,731,411, No. 2,732,350, and No. 2,756,202.

Figure 2:
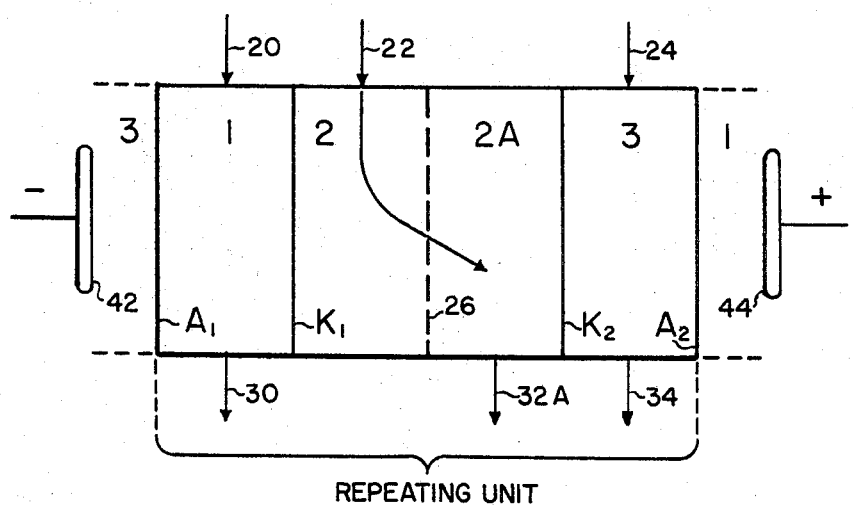
FIGURE 2 is a diagrammatic representation of a modified form of the invention wherein a non-selective porous diaphragm is also employed therein.

FIGURE 2 shows a modification of the configuration of FIGURE 1. The embodiment consists of a four-compartment repeating unit and allows substantial decontamination and reconstitution of the milk in one passage through thec ell; thereby allowing the process to operate on a continuous one-pass basis. The configuration of FIGURE 2 is similar to FIGURE 1 except that a porous or foraminous diaphragm 26 is placed in the decontaminating compartment to define the two compartments, 2 and 2A. The diaphragm is of such design and porosity that it will allow passage of solutions, such as milk, under hydraulic head or other pressure means therethrough. It is also preferably made of such suitable microporous material, as rubber, asbestos, ceramic, polyethylene, polyvinylchloride, Teflon or other synthetic materials which will not adversely affect the milk. The contaminated acidified milk enters compartment 2 by way of inlet 22. It is allowed to percolate through diaphragm 26 in a direction (as shown by the arrows) counter-current to the movement of cations. The velocity of the milk, in its passage through the diaphragm, is adjusted to be less than the electromigrating velocity of the oppositely moving cations. This allows the cations originally present in the contaminated milk to migrate substantially out of compartment 2, and not be carried, along with the flow of milk, into compartment 2A. The substantially decontaminated milk entering compartment 2A will be reconstituted with the non-contaminating cations entering said compartment via the adjoining salt solution which flows through compartment 3. The desired milk product is removed at outlet 32A.

Figure 3:
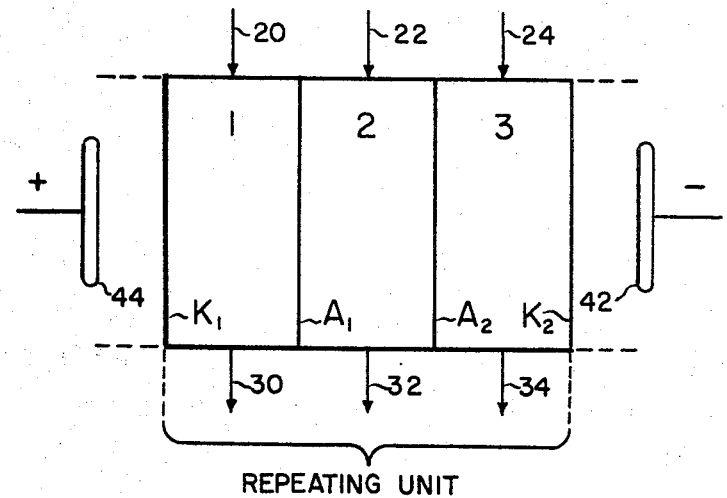
FIGURE 3 represents diagrammatically a configuration for removing anion contaminants with simultaneous replacement of non-contaminating anions.

FIGURE 3 depicts a three-compartment repeating unit for the removal of radioactive anions, such as iodine 131. This apparatus is similar in configuration and operation to the unit of FIGURE 1. However, the membrane arrangement has been modified in that cation and anion membranes have been interchanged. Decontaminating compartment 2 is now bounded on both sides by anion membranes $A_1$ and $A_2$ with cation membrane $K_1$ and $K_2$ now defining the terminal chambers of the repeating unit. Following the principles of electrodialysis as noted hereinbefore, it will be apparent that, on passage of a direct potential across the unit, the radioactive iodine will pass out of the milk compartment 2 in its migration toward the anode. Simultaneously, the non-contaminating anions from compartment 3 will migrate into the milk containing compartment to replace those non-offending anions removed during the decontamination step. The final milk product is removed at 32. It is apparent that the various embodiments of this invention employed for removal of cations can be modified in the manner shown to remove anions instead. This is accomplished by merely rearranging the membrane configuration so that cation and anion membranes replace each other. Where the contaminating material consists of both cations and anions, substantially complete removal of both constituents can be accomplished by treating the milk in series flow through separate cation and anion decontaminating units.

Figure 4:
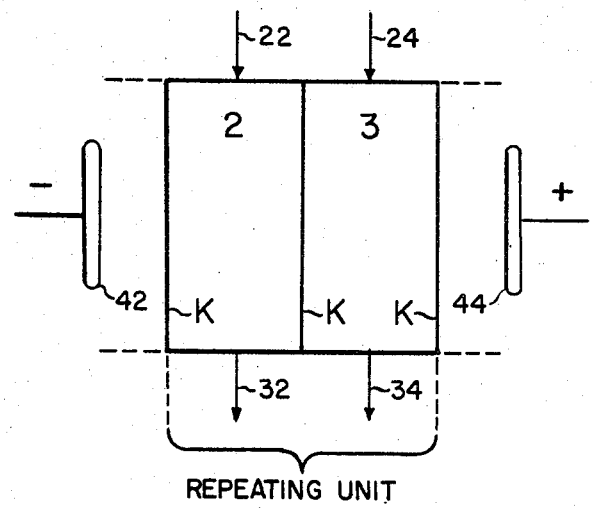
FIGURE 4 represents a two-compartment unit employing only membranes of the same selectivity.

FIGURE 4 shows a further modification of the invention wherein the repeating unit consists of two compartments, the decontaminating compartment 2 and the salt reconstituting compartment 3, with all chambers being bounded by cation membranes K. It is apparent from the configurtaion that only migration of cations in the direction of the negative pole will occur. Thus, the offending cations will migrate out of the decontamination compartment 2 with the simultaneous migration of cations into the milk from compartment 3. The milk product will issue from compartment 2 at outlet 32. It will be apparent that with all chambers of the repeating unit of FIGURE 4 bounded by anion selective membranes, a milk product may be obtained in which radioactive anions have been removed.

The following examples further illustrate the invention:

Example 1

The apparatus of FIGURE 1 may be used to demonstrate the removal of radioactive strontium from milk. The apparatus consists of 5 repeating units, thus 10 cation-permeable membranes and 6 anion permeable membranes. The active area of each membrane is approximately 1.19 ft.$^2$. Three quarts of fresh pasteurized homogenized milk are spiked with 500 micromicrocuries of strontium 90 per quart and stored under refrigeration for 72 hours. A concentration of 500 micromicrocuries of strontium 90 is substantially in excess of the maximum allowable concentration. The pH is then adjusted to 5.2 to 5.4 with aqueous citric acid and the milk is recirculated through the milk decontaminating compartment at a rate of 0.76 quart per minute and at a temperature of 100° F. The influent feed to the reconstituting salt compartment has the following composition:

| | Meq./liter |
|---|---|
| Calcium | 57 |
| Magnesium | 14 |
| Sodium | 35 |
| Potassium | 44 |
| Chloride | 150 |

The pH of this salt make-up stream is adjusted to 6. A DC potential of 20 volts is applied across the cell resulting in a current of approximately 33.3 amperes. After one hour of treatment the strontium 90 concentration of the milk is reduced to less than 50 micromicrocuries per quart. This is substantially less than the maximum allowable concentration of strontium 90. The pH of the milk is then adjusted to 6.6 with aqueous potassium hydroxide.

Example 2

The apparatus of FIGURE 2 may be used to demonstrate the removal of radioactive strontium from milk. The apparatus consists of 5 repeating units, thus 10 cation-exchange membranes, 5 porous diaphragms and 6 anion-exchange membranes. The active area of each membrane is about 0.24 square feet. Three quarts of fresh pasteurized milk are spiked with 500 micromicrocuries of strontium 90 per quart and are stored under refrigeration for 72 hours. The pH is then adjusted to 5.2 to 5.4 with aqueous citric acid. The milk is passed through the cell at a rate of 0.057 quart per minute at a temperature of 100° F. A DC potential of 27.5 volts is applied resulting in a current of about 7.2 amperes. The influent to the make-up stream has the same composition as used in Example 1. After treatment the pH of the effluent milk is adjusted to 6.6 with aqueous potassium hydroxide. The milk is found to contain about 50 micromicrocuries of strontium 90, an amount which is substantially less than the maximum allowable concentration.

Example 3

The apparatus of FIGURE 3 may be used to demonstrate the removal of radioactive iodine from milk. The apparatus consists of 5 repeating units, thus 10 anion-exchange membranes and 6 cation-exchange membranes. The active area of each membrane is about 0.24 square feet. Three quarts of fresh homogenized pasteurized milk are spiked with 500 micromicrocuries of iodine 131 per quart and are stored under refrigeration for 72 hours. (A concentration of 500 micromicrocuries is substantially in excess of the maximum allowable concentration for iodine 131.) The milk is then recirculated through the apparatus at a rate of 0.76 quart per minute and a temperature of 100° F. The influent to the make-up stream has the following composition:

| Ion: | Concentration, meq./liter |
| --- | --- |
| Sodium | 150 |
| Phosphate | 90 |
| Citrate | 30 |
| Sulfate | 5 |
| Chloride | 25 |

The pH of the make-up stream is adjusted to 6. A DC potential of 21 volts is applied resulting in a current of about 7.2 amperes. After 1 hour of treatment the iodine 131 concentration is reduced to less than 50 micromicrocuries, a value which is substantially less than the maximum allowable concentration of iodine 131.

The above description and examples are intended to be illustrative only. Any modification of or variation therefrom conforms to the spirit of the invention and is intended within the scope of the claims.

What we claim and desire to secure by Letters Patent:

1. In the method of removing radioactive ionized contaminants from milk in an electrodialysis cell having electrodes situated at each end thereof and having a plurality of repeating units therein, each unit having three adjacent compartments, the center compartment bounded on both sides by ion-exchange membranes of the same selectivity, the adjacent compartments thereto defined on their outer sides by an ion-exchange membrane of the opposite selectivity to that of said membranes bounding said center compartment, the method comprising passing a radioactive ion-contaminated milk through said center compartment, passing electrolyte solutions through said adjacent compartments, at least one of said electrolyte solutions containing non-radioactive ions for reconstituting in situ the mineral salt content of the milk in said center compartment, passing a direct current transversely through the compartments and membranes of a plurality of said repeating units to cause electrical migration of ions through said solutions and membranes, and withdrawing from said center compartment a milk solution having a lesser amount of radioactive ions than initially present in the milk and containing substantially the non-contaminated concentration of minerals normally present in milk.

2. The method of claim 1 wherein the radioactive ionic contaminants are selected from the group consisting of strontium, cesium, iodine and the rare earth elements.

3. The method of claim 1 wherein the milk is maintained at an acid pH.

4. The method of claim 2 wherein said electrolyte solution for reconstituting said milk in situ comprises ionized salts in substantially the same ionic ratio as normally contained in uncontaminated milk.

5. The method of claim 3 wherein the pH of the milk is maintained at a range of 4.8 to 6.0.

6. In the method of removing radioactive ionized contaminants from milk in an electrodialysis cell having electrodes situated at each end thereof and having a plurality of repeating units therein, each unit having four adjacent compartments, the second and third compartments being separated from each other by a microporous liquid-permeable diaphragm, said second and third compartments being separated from their adjacent compartments by an ion-exchange membrane of the same selectivity, each of said adjacent compartments defined on their other sides by an ion-exchange membrane of the opposite selectivity to that of the membrane defining said adjacent compartments from said second and third compartments, respectively, the method comprising passing a feed stream of radioactive ion-contaminated milk into said second compartment, maintaining pressure in said second compartment greater than the pressure in said adjacent third compartment to cause said milk solution to pass through said separating liquid-permeable diaphragm into said third compartment, maintaining said milk at an acid pH, passing electrolyte solutions through said adjacent compartments, said electrolyte solution adjacent to said third compartment containing non-radioactive ions for reconstituting in situ the mineral salt content of said milk in said third compartment, passing a direct current transversely through the compartments, diaphragm and membranes of said repeating units to cause electrical migration of ions through said solutions and membranes, and withdrawing from said third compartment a milk effluent having a lesser amount of radioactive ions than initially present in said milk and containing substantially all the non-contaminating concentration of minerals normally present in said milk.

7. The method of claim 6 wherein the radioactive ionic contaminants are selected from the group consisting of strontium, cesium, iodine and the rare earth elements.

8. The method of claim 6 wherein said electrolyte solution for reconstituting said milk in situ comprises ionized salts in substantially the same ionic ratio as normally contained in uncontaminated milk.

9. An electrodialysis cell comprising a plurality of repeating units between end cathode and anode electrodes, each repeating unit comprising a first, second, third and fourth compartment, respectively, the second and third compartments being separated from each other by a liquid-permeable diaphragm and being separated from their respective adjacent first and fourth compartments by a cation permselective membrane, said first compartment being disposed adjacent to the side of said second compartment facing the cathode, said fourth compartment being disposed adjacent to the side of said third compartment facing the anode, said first and fourth compartments being bounded on their outer sides by an anion permselective membrane, means for introducing a solution of radioactive contaminated milk into said second compartment with means of maintaining pressure in said second compartment greater than the pressure in the adjacent third compartment to cause said milk solution to pass through said separating liquid-permeable diaphragm into said third compartment; means for introducing electrolyte solutions into said first and fourth compartments; means for withdrawing solutions from said first, third and fourth compartments; and means for passing a direct electric current transversely through said solutions, diaphragm and membranes to cause at least the radioactive cations to pass out of the milk solution into said first compartment and simultaneously therewith causing non-radioactive cations from said fourth compartment to pass into said milk solution to replace those cations removed therefrom.

10. In the method of reducing undesirable ionic constituents of liquid milk products and simultaneously making up a corresponding increase of other desired ions therein in an electrodialysis cell having electrodes situated at each end thereof and having a plurality of repeating units therein, each unit having three adjacent compartments, the center compartment bounded on both sides by spaced ion-exchange membranes of the same selectivity, the adjacent compartments thereto defined on their outer sides by an ion-exchange membrane of the opposite selectivity to that of said membranes bounding said center compartment, the method comprising passing said milk product through said center compartment, passing electrolyte solutions through said adjacent compartments, at least one of said electrolyte solutions containing the desired ions for reconstituting in situ the ionic content of said milk in said center compartment, passing a direct current transversely through the compartments and membranes of a plurality of said repeating units to cause electrical migration of ions through said solutions and membranes, and withdrawing from said center compartments a liquid milk product having a lesser amount of undesired ions than that initially present in the said milk and containing substantially the original concentration of ions initially present in said liquid milk product.

11. The method of claim 10 wherein the undesired ionic constituent of said liquid milk product is sodium and wherein the reconstituting electrolyte solution is substantially void of such undesired ions thereby producing a substantially sodium-free liquid milk product.

References Cited

UNITED STATES PATENTS

| | | | |
|---|---|---|---|
| 3,165,415 | 1/1965 | Kilburn et al. | 204—180 |
| 2,708,658 | 5/1955 | Rosenburg | 204—180 |
| 2,739,934 | 3/1956 | Kunin | 204—180 |
| 2,921,005 | 1/1960 | Bodamer | 204—180 |
| 3,017,339 | 1/1962 | Bulter et al. | 204—180 |
| 3,051,640 | 8/1962 | Traxler | 204—180 |
| 2,604,403 | 7/1952 | Wiechers | 204—180 |

FOREIGN PATENTS 406,407   3/1934   Great Britain.

OTHER REFERENCES

Winger, Chemical Engineering Progress, "Membrane Processes Ion Exchange, vol. 53, No. 12, December 1957, pp. 606–612.

ROBERT K. MIHALEK, *Primary Examiner.*

E. ZAGARELLA, *Assistant Examiner.*

U.S. Cl. X.R.

99—60; 204—301